US009020677B2

United States Patent
Tanaka et al.

(10) Patent No.: US 9,020,677 B2
(45) Date of Patent: Apr. 28, 2015

(54) CONTROL APPARATUS FOR HYBRID VEHICLE

(71) Applicants: Toyota Jidosha Kabushiki Kaisha, Toyota-shi, Aichi-ken (JP); Aisin Seiki Kabushiki Kaisha, Kariya-shi, Aichi (JP)

(72) Inventors: Takaaki Tanaka, Susono (JP); Shinya Harada, Chiryu (JP); Hiroshi Toyoda, Okazaki (JP)

(73) Assignees: Aisin Seiki Kabushiki Kaisha, Kariya (JP); Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 14/356,759

(22) PCT Filed: Nov. 21, 2012

(86) PCT No.: PCT/JP2012/080217
§ 371 (c)(1),
(2) Date: May 7, 2014

(87) PCT Pub. No.: WO2013/077367
PCT Pub. Date: May 30, 2013

(65) Prior Publication Data
US 2014/0316627 A1 Oct. 23, 2014

(30) Foreign Application Priority Data

Nov. 22, 2011 (JP) ................................. 2011-255199

(51) Int. Cl.
*B60W 10/02* (2006.01)
*B60W 10/06* (2006.01)
(Continued)

(52) U.S. Cl.
CPC .................. *B60W 10/02* (2013.01); *B60K 6/48* (2013.01); *B60K 6/547* (2013.01); *B60L 11/14* (2013.01);
(Continued)

(58) Field of Classification Search
CPC ...... B60W 20/00; B60W 10/08; B60W 10/10
USPC ......................................... 701/22; 180/65.23
See application file for complete search history.

(56) References Cited

U.S. PATENT DOCUMENTS 6,338,391 B1 * 1/2002 Severinsky et al. ........ 180/65.23
2010/0060080 A1 * 3/2010 Sawada et al. .................. 307/48
(Continued)

FOREIGN PATENT DOCUMENTS

JP   A-2003-335152   11/2003
JP   A-2009-274718   11/2009
(Continued)

*Primary Examiner* — Yonel Beaulieu
*Assistant Examiner* — Martin Weeks
(74) *Attorney, Agent, or Firm* — Oliff PLC

(57) ABSTRACT

A control apparatus for a vehicle including a second clutch capable of switching between input and output shafts connecting state in which a motor-generation is connected. The control apparatus drives the wheels by the motor-generation so a torque transmitted to the wheels does not fluctuate in case the gear shift is executed to the transmission when is in the output shaft connecting state of the second clutch, and synchronizes the input and output shafts at the gear shift by the motor-generation in case the gear shift is executed to the transmission when the second clutch state is in the input shaft connecting state. The second clutch state is switched to the output shaft connecting state when a drive power to the vehicle is equal or less than a value. The second clutch state is switched to the input shaft connecting state when the drive power is greater than the value.

2 Claims, 4 Drawing Sheets

(51) Int. Cl.
  *B60W 10/10* (2012.01)
  *B60W 20/00* (2006.01)
  *B60K 6/48* (2007.10)
  *B60K 6/547* (2007.10)
  *B60L 11/14* (2006.01)
  *B60L 15/20* (2006.01)
  *B60W 10/08* (2006.01)
  *F16H 61/04* (2006.01)
  *F16H 61/682* (2006.01)

(52) U.S. Cl.
  CPC ............... *B60L 15/20* (2013.01); *B60W 10/08* (2013.01); *B60W 10/10* (2013.01); *B60W 20/00* (2013.01); *Y02T 10/7077* (2013.01); *B60L 2240/421* (2013.01); *B60L 2240/423* (2013.01); *B60L 2240/441* (2013.01); *B60L 2240/443* (2013.01); *B60L 2270/145* (2013.01); *Y02T 10/642* (2013.01); *F16H 61/04* (2013.01); *F16H 61/682* (2013.01); *F16H 2061/0422* (2013.01); *F16H 2061/0433* (2013.01); *B60K 2006/4808* (2013.01); *B60K 2006/4825* (2013.01); *B60K 2006/4841* (2013.01); *B60L 2240/12* (2013.01); *B60L 2240/486* (2013.01); *B60L 2240/507* (2013.01); *B60L 2250/24* (2013.01); *B60L 2250/26* (2013.01)

(56) References Cited

U.S. PATENT DOCUMENTS

2010/0234174 A1* 9/2010 Miyazaki et al. ............ 477/5
2010/0256851 A1* 10/2010 Mitsutani ..................... 701/22

FOREIGN PATENT DOCUMENTS

| JP | A-2010-208522 | 9/2010 |
| JP | A-2010-241322 | 10/2010 |
| JP | A-2010-241325 | 10/2010 |
| JP | A-2010-241394 | 10/2010 |

\* cited by examiner

CONTROL APPARATUS FOR HYBRID VEHICLE

TECHNICAL FIELD

The present invention relates to a control apparatus applied to a hybrid vehicle having an internal combustion engine and an electric motor as power sources, being provided with a transmission in a power transmission path between the internal combustion engine and a drive wheel, and being able to switch a connection destination of the electric motor between an input shaft of the transmission and an output shaft of the transmission selectively.

BACKGROUND ART

There is known a hybrid vehicle having an internal combustion engine and an electric motor such as a motor-generator as power sources, being provided a transmission in a power transmission path between the internal combustion engine and a drive wheel, and being able to switch a connection destination of an output shaft of the motor-generator between an input shaft of the transmission and an output shaft of the transmission by a switching mechanism. As a power transmission control apparatus applied to such the hybrid vehicle, there is known an apparatus to reduce an abrupt change of acceleration of the vehicle by connecting the output shaft of the motor-generator to the output shaft of the transmission and assisting a drive of the drive wheel by the motor generator, when a shift position of the transmission is changed (see Patent Literature 1). In addition, there are Patent Literatures 2-4 as prior art references in relation to the present invention.

CITATION LIST

Patent Literature

Patent Literature 1: JP-2010-241322A
Patent Literature 2: JP-2003-335152A
Patent Literature 3: JP-2010-241394A
Patent Literature 4: JP-2009-274718A

SUMMARY OF INVENTION

Technical Problem

In the apparatus of the Patent Literature 1, there is a possibility that an assistance of the motor-generator is insufficient when drive power which is greater than a rated power of the motor-generator has been required to the vehicle when the shift position being changed. In this case, since a torque which is transmitted to the drive wheel is decreased, there is a possibility that a driver has a feeling of strangeness.

In view of the foregoing, one object of the present invention is to provide a control apparatus for hybrid vehicle capable of reducing the feeling of strangeness the driver has when the shift position being changed.

Solution to Problem

A control apparatus of the present invention which is applied to a hybrid vehicle, the hybrid vehicle having an internal combustion engine and an electric motor as power sources, and including a transmission and a connection destination switching device, the transmission including: an input shaft which is connected to the internal combustion engine via a clutch device; an output shaft which is connected to a drive wheel so as to transmit power; and plural shift gear pairs, each of the plural shift gear pairs having a pair of gears, one gear of the pair of gears being provided on the input shaft, and another gear of the pair of gears being provided on the output shaft so as to engage with the one gear, and each of the shift gear pairs being set a gear ratio which differs from each other, the transmission changing shift positions by establishing a transmission of rotation between the input shaft and the output shaft selectively by any one of the plural shift gear pairs, and the connection destination switching device being capable of switching between: an input shaft connecting state in which the electric motor and the input shaft are connected with each other so as to transmit the power; and an output shaft connecting state in which the electric motor and the output shaft are connected with each other so as to transmit the power, the control apparatus includes a control device which is configured to: drive the drive wheel by the electric motor so that a torque transmitted to the drive wheel does not fluctuate in a case that the shift position of the transmission is changed when the state of the connection destination switching device is the output shaft connecting state; and synchronize the input shaft and the output shaft at a moment of gear shift by the electric motor in a case that the shift position of the transmission is changed when the state of the connection destination switching device is the input shaft connecting state, wherein the control device includes a connection destination control device which is configured to switch the state of the connection destination switching device to the output shaft connecting state when a required drive power to the vehicle is equal to or less than a predetermined determination value, and switch the state of the connection destination switching device to the input shaft connecting state when the required drive power to the vehicle is greater than the determination value.

According to the control apparatus of the present invention, since the electric motor is connected to the output shaft of the transmission when the required drive power is equal to or less than the determination value, the drive wheel is driven by the electric motor so that the torque of the drive wheel does not fluctuate at the moment when the shift position is changed. Thereby, it is possible to reduce the feeling of strangeness which the driver will have. On the other hand, since the electric motor is connected to the input shaft of the transmission when the required drive power is greater than the determination value, the input shaft and the output shaft are synchronized with each other by the electric motor at the moment when the shift position is changed. Thereby, it is possible to shorten a period required to change the shift position. In this case, even though the torque transmitted to the drive wheel decreases at the moment when the shift position is changed, it is possible to shorten the period when the torque decreases. Accordingly, it is possible to reduce the feeling of strangeness which the driver will have. According to the present invention in this manner, by switching the control of the electric motor at the moment when the shift position is changed depending on the required driver power, it is possible to reduce the feeling of strangeness which the driver will have.

In one embodiment of the control apparatus of the present invention, a value which is equal to or less than a rated power of the electric motor may be set as the determination value. According to this embodiment, it is possible to prevent a shortage of the power of the electric motor for the required drive power in a case that the drive wheel is driven by the electric motor when the shift position is changed. Thereby, it is possible to prevent a rapid decrease of an acceleration of the vehicle at the moment when the shift position is changed.

DESCRIPTION OF EMBODIMENTS

Figure 1:
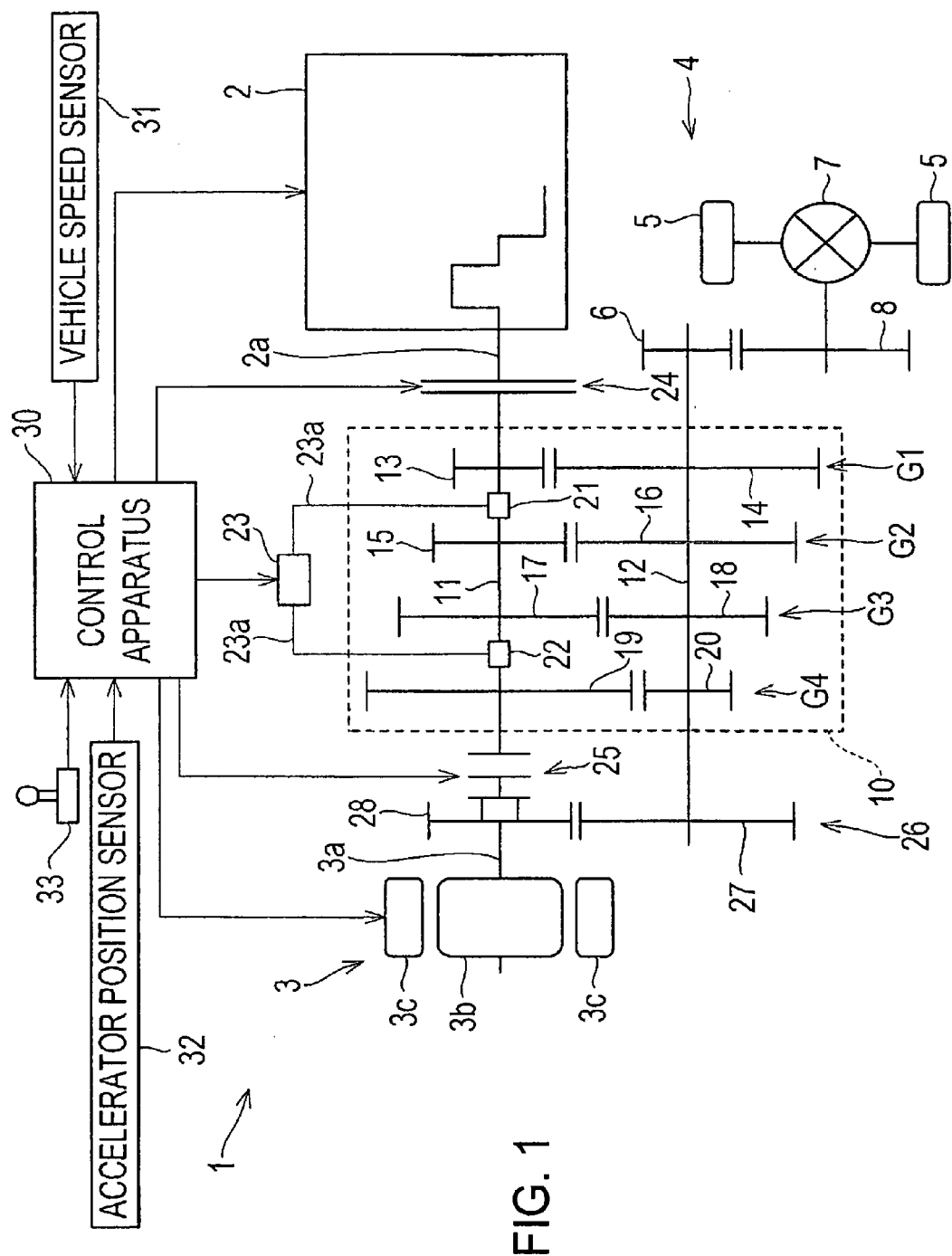
FIG. 1 is a schematic diagram showing a vehicle where a control apparatus according to one embodiment of the present invention is incorporated.

FIG. 1 is a schematic diagram showing a vehicle where a control apparatus according to one embodiment of the present invention is incorporated. The vehicle 1 includes an internal combustion engine (hereinafter, referred to as an engine) 2 and a motor-generator (hereinafter, referred to as a MG) 3 as an electric motor, as power sources. That is, the vehicle 1 is configured as a hybrid vehicle. The engine 2 is a well known spark ignition type internal combustion engine having four cylinders. The MG 3 is a well known motor-generator which functions as an electric motor and a generator and is mounted on the hybrid vehicle. The MG 3 includes a rotor 3b which rotates integrally with a rotor shaft 3a and a stator 3c which is arranged on an outer circumference of the rotor 3b coaxially and is fixed to a case (not shown). A transmission 10 providing four forward-drive shift positions is mounted on the vehicle 1, and the engine 2 and the MG 3 are connected to the transmission 10. Furthermore, the transmission 10 is connected to an output portion 4 for outputting power to drive wheels 5 of the vehicle 1. The output portion 4 includes an output gear 6 and a differential mechanism 7 which is connected to the drive wheels 5. The output gear 6 is attached to an output shaft 12 of the transmission 10 so as to rotate integrally with the output shaft 12. Furthermore, the output gear 6 is engaged with a ring gear 8 which is provided on a case of the differential mechanism 7. The differential mechanism 7 is a well known mechanism which splits transmitting power into the right and left drive wheels 5.

The transmission 10 includes an input shaft 11 and the output shaft 12. First to fourth shift gear pairs G1 to G4 are provided between the input shaft 11 and the output shaft 12. The first shift gear pair G1 is configured by a first drive gear 13 and a first driven gear 14 which engage with each other. The second shift gear pair G2 is configured by a second drive gear 15 and a second driven gear 16 which engage with each other. The third shift gear pair G3 is configured by a third drive gear 17 and a third driven gear 18 which engage with each other. The fourth shift gear pair G4 is configured by a fourth drive gear 19 and a fourth driven gear 20 which engage with each other. The first to fourth shift gear pairs G1 to G4 are provided so that the drive gear and the driven gear engage with each other at all times. Gear ratios are set to the shift gear pairs G1 to G4 respectively, each of the gear ratios differing from each other. The gear ratios are set so as to get smaller in the order of the first shift gear pair G1, the second shift gear pair G2, the third shift gear pair G3, and the fourth shift gear pair G4. Thereby, the first shift gear pair G1 corresponds to a first gear, and the second shift gear pair G2 corresponds to a second gear. Furthermore, the third shift gear pair G3 corresponds to a third gear, and the fourth shift gear pair G4 corresponds to a fourth gear.

The first to fourth drive gears 13, 15, 17, and 19 are supported on the input shaft 11 so as to be rotatable relative to the input shaft 11. Thereby, each of these drive gears 13, 15, 17, and 19 corresponds to one gear of the present invention. As shown in this figure, these gears are arranged so as to be aligned along an axis direction in the order of the first drive gear 13, the second drive gear 15, the third drive gear 17, and the fourth drive gear 17. On the other hand, the first to fourth driven gears 14, 16, 18, and 20 are fixed on the output shaft 12 so as to rotate integrally with the output shaft 12. Thereby, each of these driven gears 14, 16, 18, and 20 corresponds to another gear of the present invention.

A first sleeve 21 and a second sleeve 22 are provided on the input shaft 11. These sleeves 21 and 22 are supported on the input shaft 11 so as to rotate integrally with the input shaft 11 and to move along the axis direction. As shown in this figure, the first sleeve 21 is provided between the first drive gear 13 and the second drive gear 15. The second sleeve 22 is provided between the third drive gear 17 and the fourth drive gear 19.

The first sleeve 21 is provided so as to be switchable among a first gear position, a second gear position, and a release position. At the first gear position, the first sleeve 21 engages with the first drive gear 13 so that the input shaft 11 and the first drive gear 13 rotate integrally with each other. At the second gear position, the first sleeve 21 engages with the second drive gear 15 so that the input shaft 11 and the second drive gear 15 rotate integrally with each other. At the release position, the first sleeve 21 engages with neither the first drive gear 13 nor the second drive gear 15. The second sleeve 22 is provided so as to be switchable among a third gear position, a fourth gear position, and a release position. At the third gear position, the second sleeve 22 engages with the third drive gear 17 so that the input shaft 11 and the third drive gear 17 rotate integrally with each other. At the fourth gear position, the second sleeve 22 engages with the fourth drive gear 19 so that the input shaft 11 and the fourth drive gear 19 rotate integrally with each other. At the release position, the second sleeve 22 engages with neither the third drive gear 17 nor the fourth drive gear 19. In the transmission 10, a power transmission between the input shaft 11 and the output shaft 12 is shut off when both of the first sleeve 21 and the second sleeve 22 are switched to the release positions. Hereinafter, this state is sometimes referred to as a neutral state. When the shift position is changed, first, a state of the transmission 10 is changed to the neutral state from a state before the gear shift. Thereafter, the state of the transmission 10 is changed to a state after the gear shift from the neutral state. Although not shown, plural synchronization mechanisms are provided on the input shaft 11. Each of the plural synchronization mechanisms synchronizes between a rotating speed of each of the first and second sleeves 21 or 22 and a rotating speed of each of the first to fourth drive gears 13, 15, 17, or 19 when each of the first and second sleeves 21 or 22 and each of the first to fourth drive gears 13, 15, 17, or 19 are engaged. Each of the plural synchronization mechanisms may be provided by a synchronization mechanism which synchronizes rotating speeds by using a frictional engagement, for example a key synchromesh mechanism already known. Thereby, a detailed description of the synchronization mechanism will be omitted.

The transmission 10 is provided with an actuator 23 to drive the first sleeve 21 and the second sleeve 22. The actuator 23 drives each of the sleeves 21 and 22 by driving a shift fork 23a which engages each of the sleeves 21 and 22.

As shown in this figure, the input shaft 11 is connected with an output shaft 2a of the engine 2 via a first clutch 24 as a clutch device. The first clutch 24 is a well known clutch which is switchable between an engagement state and a release state. In the engagement state, a power is transmitted between the engine 2 and the input shaft 11. In the release state, a power transmission between the engine 2 and the input shaft 11 is shut off.

The rotor shaft 3a of the MG 3 is provided with a second clutch 25 as a connection destination switching device. A constant engagement type gear pair 26 is provided between the rotor shaft 3a and the output shaft 12. The gear pair 26 includes a first gear 27 which is fixed on the output shaft 12 and a second gear 28 which is supported on the rotor shaft 3a and engages with the first gear 27. The second clutch 25 is configured so as to be switchable among an input shaft connecting state, an output shaft connecting state, and a release state. In the input shaft connecting state, the rotor shaft 3a and the input shaft 11 are connected to each other so as to transmit power. In the output shaft connecting state, the rotor shaft 3a and the output shaft 12 are connected to each other so as to transmit power via the gear pair 26. In the release state, the rotor shaft 3a is separated from both of the input shaft 11 and the output shaft 12. The second clutch 25 may be provided by a well known dog clutch which is able to switch connection destinations by switching a position of a sleeve.

Each operation of the engine 2, the MG 3, the transmission 10, the first clutch 24, and the second clutch 25 is controlled by a control apparatus 30. The control apparatus 30 is configured as a computer unit including a microprocessor and peripheral devices, such as a RAM and a ROM, which are necessary for the operations of the microprocessor. The control apparatus 30 holds various control programs for running the vehicle 1 appropriately. The control apparatus 30 controls control objects such as the engine 2 and the MG 3 by executing these programs. The control apparatus 30 is connected with various sensors for obtaining information with respect to the vehicle 1. The control apparatus 30 is connected with a vehicle speed sensor 31 and an accelerator position sensor 32, for example. The vehicle speed sensor 31 outputs a signal corresponding to speed of the vehicle 1 (vehicle speed). The accelerator position sensor 32 outputs a signal corresponding to an accelerator opening degree. In addition, various sensors are further connected to the control apparatus 30, but they are omitted in the figure. Furthermore, the control apparatus 30 is connected to various switches and levers which are operated by the driver. The control apparatus 30 is connected to a shift lever 33 for the driver to select running modes of the vehicle 1 and shift positions, for example. As the running modes of the vehicle 1, an EV running mode and an engine running mode are provided, for example. In the EV running mode, the vehicle 1 is run by using the MG 3 only. In the engine running mode, the vehicle 1 is run by the engine 2. In the engine running mode, an automatic gear shift mode and a manual mode are provided. In the automatic gear shift mode, the control apparatus 30 switches the shift position based on the vehicle speed and the accelerator opening degree. In the manual mode, the driver selects the shift position. In the manual mode, the driver selects the shift position by operating the shift lever 33.

In the vehicle 1, as gear shift modes for changing the shift position, a rotating speed synchronization assist mode and a gear shift torque assist mode are provided. In the vehicle 1, when the shift position is changed, first, the first clutch 24 is switched to the release state. Subsequently, both of the first sleeve 21 and the second sleeve 22 are switched to the release position, to change a state of the transmission 10 to the neutral state. Next, in the neutral state, the rotating speed of the input shaft 11 and the rotating speed of the output shaft 12 are synchronized with each other. After synchronizing the input shaft 11 and the output shaft 12, each of the sleeves 21 and 22 is moved to a position which should be a shift position after the gear shift. Thereafter, the first clutch 24 is switched to the engagement state. This change of the shift position is completed.

In the gear shift torque assist mode, the output shaft 12 is driven by the MG 3 so that the torque which is transmitted to the drive wheels 5 does not fluctuate when the first clutch 24 is in the release state and the transmission 10 is in a neutral state. On the other hand, in the rotating speed synchronization assist mode, the rotating speed of the input shaft 11 is adjusted by the MG 3 at the neutral state, and the rotating speed of the input shaft 11 and the rotating speed of the output shaft 12 are synchronized with each other quickly. And, as a result, a period of the neutral state is decreased.

Figure 2:
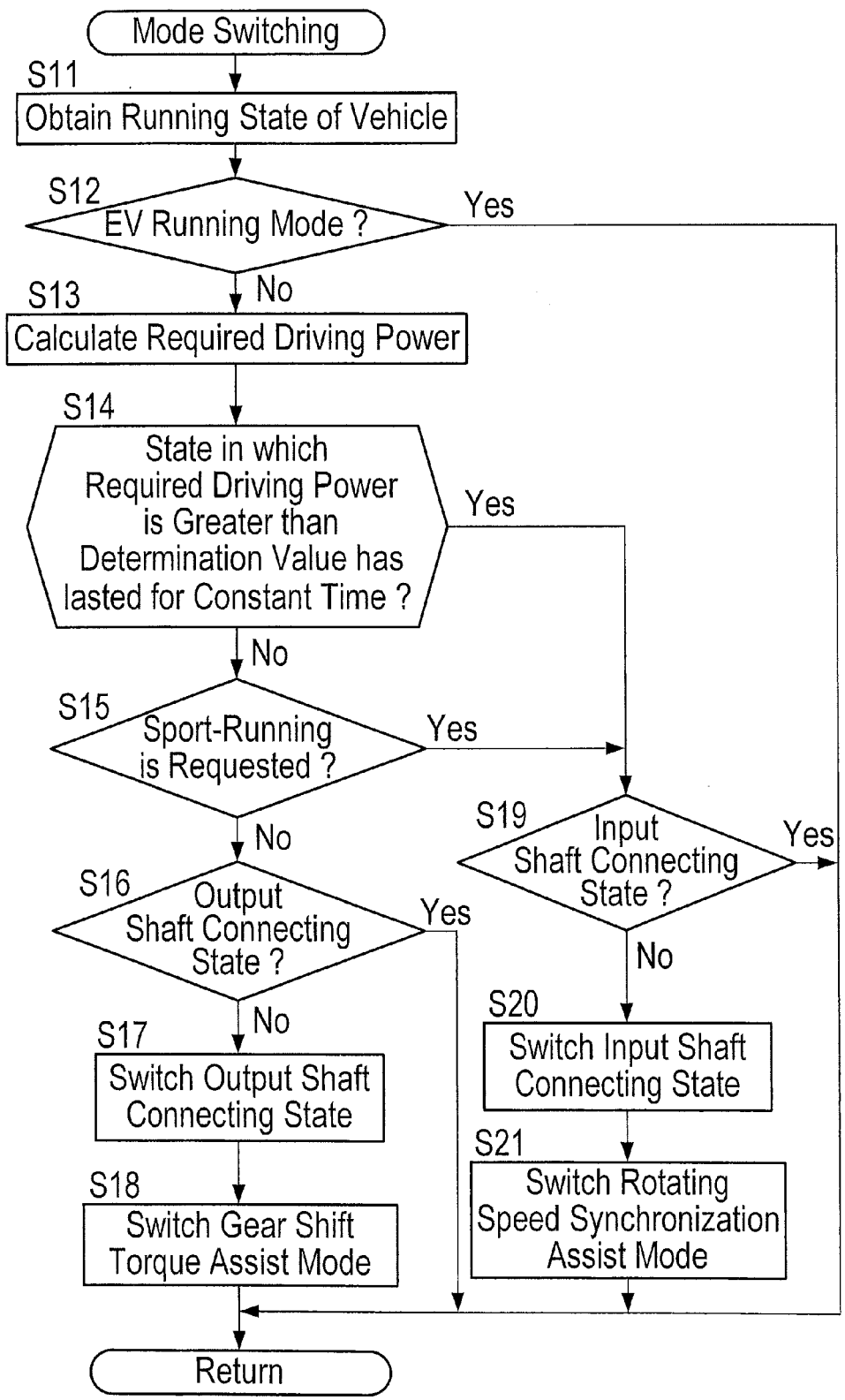
FIG. 2 is a flowchart showing a mode switching routine executed by the control apparatus.

FIG. 2 shows a mode switching routine which the control apparatus 30 executes for switching between these running modes depending on a running state of the vehicle 1. The control apparatus 30 repeatedly executes this control routine at predetermined intervals while the vehicle 1 is running.

In the routine, the control apparatus 30 first obtains the running state of the vehicle 1 in step S11. The control apparatus 30 obtains the vehicle speed and the accelerator opening degree as the running state of the vehicle 1. In the next step S12, the control apparatus 30 determines whether or not the running mode of the vehicle 1 is the EV running mode. When the control apparatus 30 determines that the running mode is the EV running mode, the control apparatus 30 ends the present routine. On the other hand, when the control apparatus 30 determines that the running mode is not the EV running mode, the control apparatus 30 goes to step S13 and calculates a driving power (a required driving power) which the driver requires to the vehicle 1 based on the vehicle speed and the accelerator opening degree. In the next step S14, the control apparatus 30 determines whether or not the state in which the required driving power is greater than a predetermined determination value has lasted for a constant time. The determination value is set as a criterion for determining whether or not the MG 3 can output a torque so that the torque which is transmitted to the drive wheels 5 does not fluctuate at the moment when the shift position is changed. The determination value is set a rated power of the MG 3, for example. The determination value may be set a value which is smaller than the rated power of the MG 3.

When the control apparatus 30 determines that the state in which the required driving power is greater than the determination value has not lasted for the constant time, the control apparatus 30 goes to step S15 and determines whether or not the driver requests a sport-running to the vehicle 1. The sport-running includes a running in which an acceleration and a deceleration of the vehicle 1 increase and a running in which the vehicle 1 responds quickly in response to the operation of the driver. It may be determined whether or not the sport-running is required based on the running mode of the vehicle 1 and the accelerator opening degree, for example. In particular, it may be determined that the sport-running is required when the running mode of the vehicle 1 is the manual mode and the accelerator opening degree is greater than a predetermined threshold value. In addition, when a sport-running mode is set as the running mode and a switch for the driver to select the sport-running mode is provided with the vehicle 1, it may be determined that the sport-running is required when the sport-running mode is selected by the switch and the accelerator opening degree is greater than the threshold value.

When the control apparatus 30 determines that the driver does not request the sport-running, the control apparatus 30 goes to step S16 and determines whether or not the state of the second clutch 25 is the output shaft connecting state. When the control apparatus 30 determines that the state of the second clutch 25 is the output shaft connecting state, the control apparatus 30 ends the present routine. On the other hand, the control apparatus 30 determines that the state of the second clutch 25 is the input shaft connecting state or the release state, the control apparatus 30 goes to step S17 and switches the state of the second clutch 25 to the output shaft connecting state. In the next step S18, the control apparatus 30 switches the gear shift mode to the gear shift torque assist mode. Thereafter, the control apparatus 30 ends the present routine.

On the other hand, when the control apparatus 30 determines the step S14 to be affirmative or the step S15 to be affirmative, the control apparatus 30 goes to step S19 and determines whether or not the state of the second clutch 25 is the input shaft connecting state. When the control apparatus 30 determines that the state of the second clutch 25 is the input shaft connecting state, the control apparatus 30 ends the present routine. On the other hand, the control apparatus 30 determines that the state of the second clutch 25 is the output shaft connecting state or the release state, the control apparatus 30 goes to step S20 and switches the state of the second clutch 25 to the input shaft connecting state. In the next step S21, the control apparatus 30 switches the gear shift mode to the rotating speed synchronization assist mode. Thereafter, the control apparatus 30 ends the present routine.

By switching the gear shift mode in this manner, the MG 3 is connected to the output shaft 12 in the gear shift torque assist mode, and the MG 3 is connected to the input shaft 11 in the rotating speed synchronization assist mode. By executing the routine of FIG. 2, the control apparatus 30 functions as a connection destination control device of the present invention.

Figure 3:
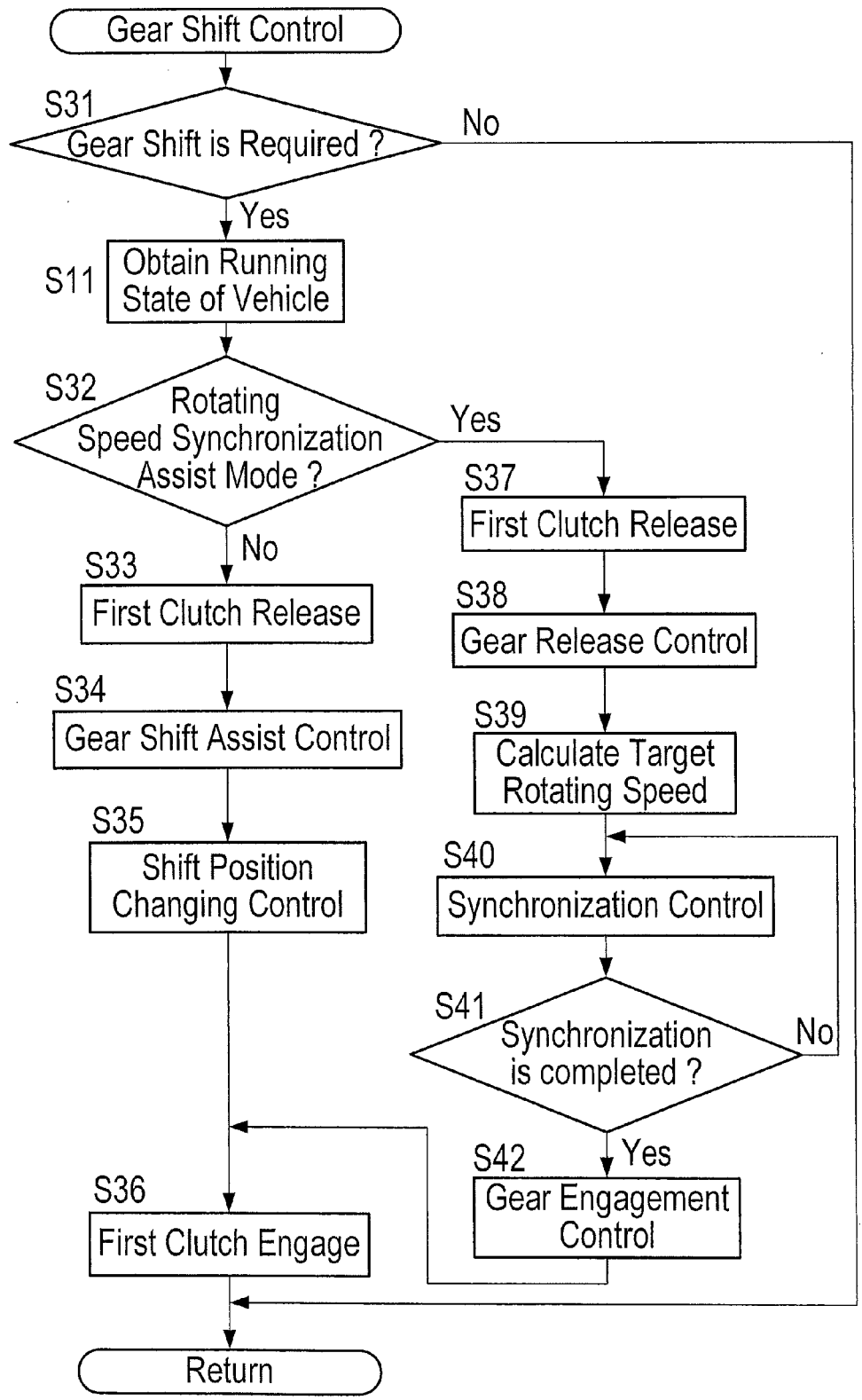
FIG. 3 is a flowchart showing a gear shift control routine executed by the control apparatus.

FIG. 3 shows a gear shift control routine which the control apparatus 30 executes for shifting gear at each gear shift mode. The control apparatus 30 repeatedly executes this control routine at predetermined intervals while the vehicle 1 is running. In this control routine, the same processes as those of the routine of FIG. 2 are denoted by the same reference numerals respectively, and descriptions thereof will be omitted. By executing this control routine, the control apparatus 30 functions as a control device of the present invention.

In the control routine, the control apparatus 30 first determines whether or not the changing of the shift position has been required, that is, the gear shift has been required. The automatic gear shift mode is different from the manual mode in a method for determining whether or not the gear shift has been required. In a case of the manual mode, the control apparatus 30 determines that the gear shift has been required when the driver operates the shift lever 33 for changing the shift position, for example. In a case of the automatic gear shift mode, the control apparatus 30 determines that the gear shift has been required when a current driving state of the vehicle 1 moves outside of an operating range where the current shift position is set, for example. When the control apparatus 30 determines that the gear shift has not been required, the control apparatus 30 ends the present control routine.

On the other hand, when the control apparatus 30 determines that the gear shift has been required, the control apparatus 30 goes to step S11 and obtains the running state of the vehicle 1. In the next step S32, the control apparatus 30 determines whether or not the gear shift mode is the rotating speed synchronization assist mode. When the control apparatus 30 determines that the gear shift mode is not the rotating speed synchronization assist mode, that is, the control apparatus 30 determines that the gear shift mode is the gear shift torque assist mode, the control apparatus 30 goes to step S33 and switches the state of the first clutch 24 to the release state. In the next step S34, the control apparatus 30 executes a gear shift assist control. In the gear shift assist control, as described above, the MG 3 is controlled so that the torque which is transmitted to the drive wheels 5 does not fluctuate when the shift position is changed. In the next step S35, the control apparatus 30 executes a shift position changing control for changing the shift position. In the shift position changing control, the rotating speed of the input shaft 11 and the rotating speed of the output shaft 12 are synchronized with each other by the synchronization mechanism. Furthermore, the control apparatus 30 controls the MG 3 so that the torque which is transmitted to the drive wheels 5 does not fluctuate by executing the gear shift assist control, while executing the shift position changing control. In the next step S36, the control apparatus 30 switches the state of the first clutch 24 to the engagement state. Thereafter, the control apparatus 30 ends the present control routine.

On the other hand, when the control apparatus 30 determines the step S32 to be affirmative, the control apparatus 30 goes to step S37 and switches the state of the first clutch 24 to the release state. In the next step S38, the control apparatus 30 executes a gear release control for changing the state of the transmission 10 to the neutral state from the state of the current shift position. In the next step S39, the control apparatus 30 calculates a target rotating speed of the input shaft 11. The target rotating speed may be calculated by using a well known method based on the gear ratio of the shift position after the gear shift and the rotating speed of the output shaft 12. In the next step S40, the control apparatus 30 executes a synchronization control for adjusting the rotating speed of the input shaft 11 to the target rotating speed by using the MG 3. In the nest step S41, the control apparatus 30 determines whether or not the synchronization between the rotating speed of the input shaft 11 and the rotating speed of the output shaft 12 has been completed. It may be determined that the synchronization of the rotating speeds has been completed when the rotating speed of the input shaft 11 is within a predetermined acceptable rotating speed range centering on the target rotating speed, for example. The acceptable rotating speed range may be set appropriately so that the sleeve can engage with the drive gear quickly when the state of the transmission 10 is switched to the state of the shift position after the gear shift from the neutral state. When the control apparatus 30 determines that the synchronization has not yet completed, the control apparatus 30 returns to step S40.

On the other hand, when the control apparatus 30 determines that the synchronization has been completed, the control apparatus 30 goes to step S42 and executes a gear engagement control for changing the state of the transmission 10 to the state of the shift position after gear shift from the neutral state. In the next step S36, the control apparatus 30 switches the state of the first clutch 24 to the engagement state. Thereafter, the control apparatus 30 ends the present control routine.

Figure 4:
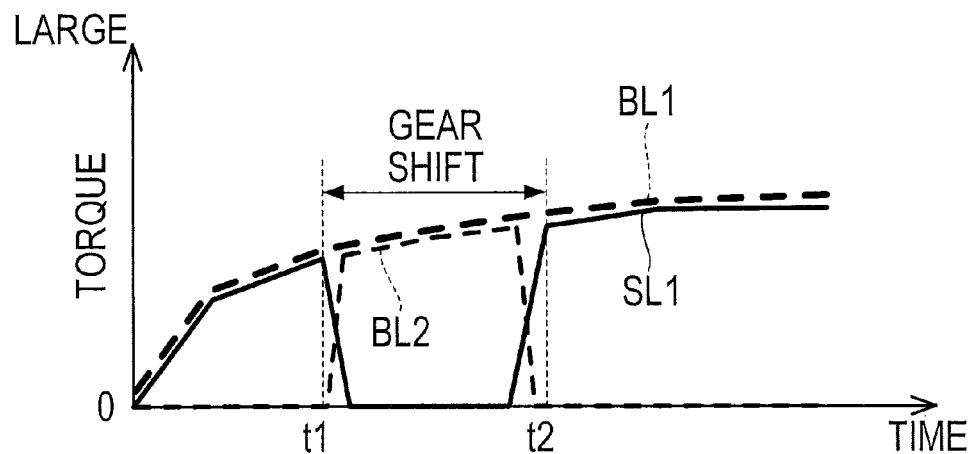
FIG. 4 is a graph showing temporal variations of a driver request torque, a drive wheel engine torque, and a drive wheel MG torque in a case that a shift position is changed in a gear shift torque assist mode.

FIG. 4 shows temporal variations of a driver request torque, a drive wheel engine torque, and a drive wheel MG torque in a case that the shift position is changed in the gear shift torque assist mode. The driver request torque is a torque which the driver requires to the vehicle 1. A thick broken line BL1 shows the driver request torque. The drive wheel engine torque is a torque which is transmitted to the drive wheels 5 from the engine 2. A solid line SL1 shows the drive wheel engine torque. The drive wheel MG torque is a torque which is transmitted to the drive wheels 5 from the MG 3. A thin broken line BL2 shows the drive wheel MG torque. Furthermore, in this graph, the state of the first clutch 24 is changed to the release state to start the gear shift at time t1, and the state of the first clutch 24 is changed to the engagement state to complete the gear shift at time t2. Thereby, the torque of the engine 2 is not transmitted to the output shaft 12 in a period from the time t1 to the time t2.

In the gear shift torque assist mode, when the first clutch 24 is released at the time t1, the drive wheels 5 are driven by the MG 3 to adjust the torque which is transmitted to the drive wheels 5 to the driver request torque. As the result, it is possible to suppress decreasing the torque which is transmitted to the drive wheels 5. Thereby, it is possible to prevent a rapid change of the acceleration at the moment of gear shift. Accordingly, it is possible to reduce the feeling of strangeness which the driver will have.

Figure 5:
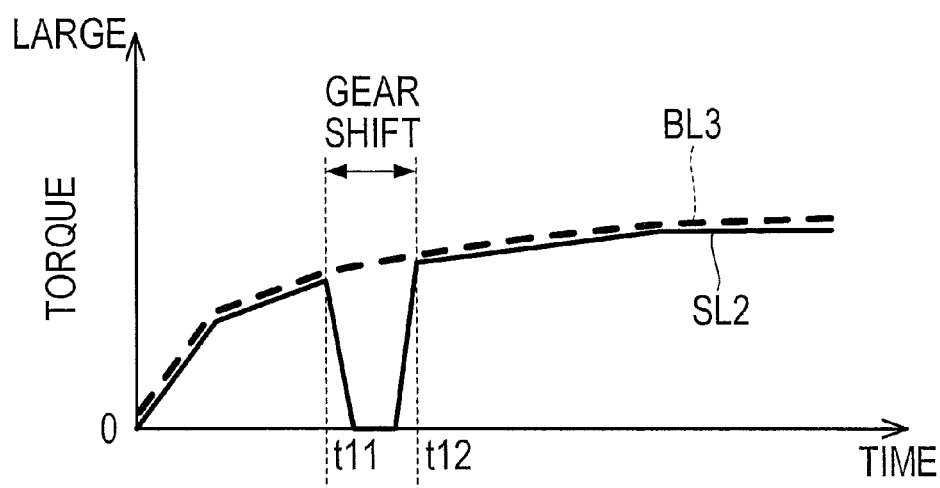
FIG. 5 is a graph showing temporal variations of a driver request torque, a drive wheel engine torque, and a drive wheel MG torque in a case that a shift position is changed in a rotating speed synchronization assist mode.
Figure 5:
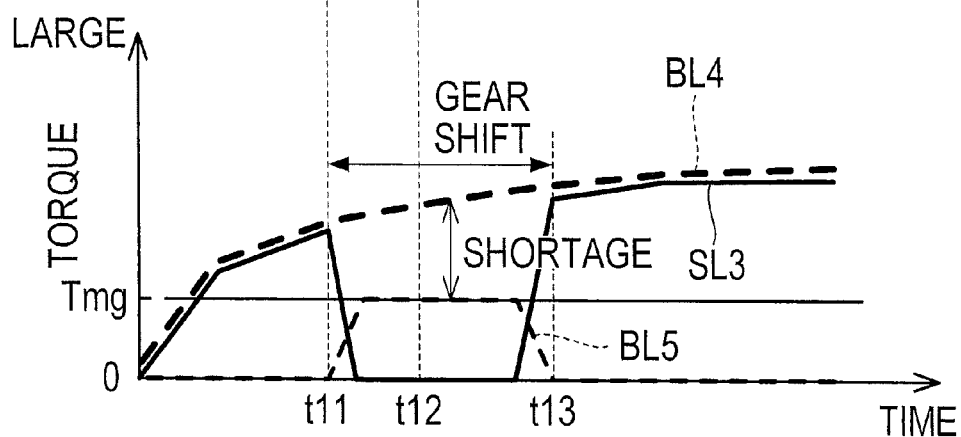

FIG. 5 shows temporal variations of the driver request torque, the drive wheel engine torque, and the drive wheel MG torque in a case that the shift position is changed in the rotating speed synchronization assist mode. In this graph, a thick broken line BL3 shows the driver request torque. And, a solid line SL2 shows the drive wheel engine torque. As described above, the rotating speed synchronization assist mode is selected when the required driving power is greater than the determination value. And, a value which is equal to or less than the rated power of the MG 3 is set as the determination value. That is, the rotating speed synchronization assist mode is selected when the required driving power is greater than the rated power of the MG 3. This graph shows, as a comparative example, temporal variations of the driver request torque, the drive wheel engine torque, and the drive wheel MG torque in a case that the shift position is changed in the gear shift torque assist mode when the required driving power is greater than the rated power of the MG 3. In the comparative example, a thick broken line BL4 shows the driver request torque, and a solid line SL3 shows the drive wheel engine torque. Furthermore, a thin broken line BL5 shows the drive wheel MG torque. In this graph, at time t11, the state of the first clutch 24 is switched to the release state to start the gear shift. And, at time t12, the state of the first clutch 24 is changed to the engagement state to complete the gear shift. Time t13 shows time when the state of the first clutch 24 is changed to the engagement state to complete the gear shift in the comparative example.

As shown apparently in this graph, in the rotating speed synchronization assist mode, since the rotating speed of the input shaft 11 and the rotating speed of the output shaft 12 are synchronized by the MG 3, it is possible to change the shift position quickly. As a result, since it is possible to shorten a period when the torque which is transmitted to the drive wheels 5 decreases, it is possible to reduce the feeling of strangeness which the driver will have. On the other hand, as shown in the comparative example, in a case that the shift position is changed in the gear shift torque assist mode when the required driving power (driver request torque) is greater than the rated power Tmg of the MG 3, the torque which is transmitted to the drive wheels 5 during the gear shift becomes less than the driver request torque. Furthermore, a period required to change the shift position becomes long as compared to the rotating speed synchronization assist mode. Thereby, the driver feels the feeling of strangeness.

As described above, according to the present invention, when the required driving power is equal to or less than the determination value as which a value is equal to or less than the rated power of the MG 3 should be set, the state of the second clutch 25 is switched to the output shaft connecting state to select the gear shift torque assist mode. As a result, since it is possible to suppress decreasing the torque of the drive wheels 5 during the gear shift, it is possible to reduce the feeling of strangeness which the driver will have. On the other hand, when the required driving power is greater than the determination value, the state of the second clutch 25 is switched to the input shaft connecting state to select the rotating speed synchronization assist mode. As a result, since it is possible to shorten a period when the torque of the drive wheels 5 decreases during the gear shift, it is possible to reduce the feeling of strangeness which the driver will have. In the present invention, even though the torque of the drive wheels 5 during the gear shift cannot be assisted sufficiently by the MG 3, it is possible to reduce the feeling of strangeness which the driver will have. Furthermore, in the present invention, since the feeling of strangeness which the driver will have is reduced by switching the gear shift mode, it is possible to decrease the rated power of the MG 3. Thereby, it is possible to suppress increase of the size of the MG 3 and increase of the cost.

The present invention is not limited to the above-described embodiments, and various modifications of the present invention may be provided. For example, the transmission of the vehicle which is applied to the present invention is not limited to a 4-forward-gear transmission. The transmission may be a 3, 5, or more forward-gear transmission, for example. Furthermore, all of the plural sleeves may not be provided on the input shaft. For example, all of the plural sleeves may be provided on the output shaft. Alternatively, a part of the plural sleeves may be provided on the input shaft, and the rest of the plural sleeves may be provided on the output shaft.

The invention claimed is:

1. A control apparatus for a hybrid vehicle operated by a driver, the hybrid vehicle having an internal combustion engine and an electric motor as power sources, and including a transmission and a connection destination switching device, the transmission including:
    (i) an input shaft which is connected to the internal combustion engine via a clutch device;
    (ii) an output shaft which is connected to a drive wheel so as to transmit power; and
    (iii) plural shift gear pairs, each of the plural shift gear pairs having a pair of gears, one gear of the pair of gears being provided on the input shaft, and another gear of the pair of gears being provided on the output shaft so as to engage with the one gear, and each of the shift gear pairs being set a gear ratio which differs from each other,
    the transmission changing shift positions by establishing a transmission of rotation between the input shaft and the output shaft selectively by any one of the plural shift gear pairs, and
    the connection destination switching device being capable of switching between: an input shaft connecting state in which the electric motor and the input shaft are connected with each other so as to transmit the power; and an output shaft connecting state in which the electric motor and the output shaft are connected with each other so as to transmit the power,
    the control apparatus being programmed so as to include control programming instructions that are executed by a processor, the control programming instructions of the control apparatus comprising:
    driving the drive wheel by the electric motor so that a torque transmitted to the drive wheel does not fluctuate in a case where the shift position of the transmission is changed in response to the state of the connection destination switching device is being the output shaft connecting state;

synchronizing the input shaft and the output shaft at a moment of gear shift by the electric motor in a case where the shift position of the transmission is changed in response to the state of the connection destination switching device being the input shaft connecting state;

switching the state of the connection destination switching device to the output shaft connecting state in response to a required drive power to the vehicle being equal to or less than a predetermined determination value;

switching the state of the connection destination switching device to the input shaft connecting state in response to the required drive power to the vehicle being greater than the determination value, wherein during a state where the required drive power to the vehicle is equal to or less than the determination value, the state of the connection destination switching device is switched to the input shaft connecting state when the vehicle is operating in a running state in which the vehicle responds quickly in response to an operation of the driver.

2. The control apparatus according to claim 1, wherein a value which is equal to or less than a rated power of the electric motor is set as the determination value.

\* \* \* \* \*